United States Patent [19]

Cross et al.

[11] Patent Number: 4,759,525
[45] Date of Patent: Jul. 26, 1988

[54] ATTACHABLE BEVERAGE COASTER

[75] Inventors: Gregory L. Cross; Wendell C. Cross, both of Arvada, Colo.

[73] Assignee: Sun Company, Wheat Ridge, Colo.

[21] Appl. No.: 71,337

[22] Filed: Jul. 9, 1987

[51] Int. Cl.⁴ ............................................. A47B 91/00
[52] U.S. Cl. ................................ 248/346.1; 248/206.2
[58] Field of Search ...................... 248/362, 363, 205.5, 248/205.8, 206.2, 346.1, 359.1, 154, 146; 215/100.5; 220/212; 47/71

[56] References Cited

U.S. PATENT DOCUMENTS

| 1,925,241 | 9/1933 | Fullerton | 215/100.5 |
| 2,561,127 | 7/1951 | Lockwood | 215/100.5 |
| 2,565,793 | 8/1951 | Weismantel et al. | 248/362 |
| 2,688,858 | 9/1954 | Cosmetto | 248/346.1 |
| 2,740,545 | 4/1956 | Bates | 215/100.5 |
| 2,910,264 | 10/1959 | Lindenberger | 248/362 |
| 2,968,888 | 1/1961 | Borah | 248/362 |
| 3,142,934 | 8/1964 | Mehling | 215/100.5 X |

FOREIGN PATENT DOCUMENTS 358589 10/1931 United Kingdom ................ 248/362

Primary Examiner—J. Franklin Foss
Attorney, Agent, or Firm—William P. O'Meara; Horace B. VanValkenburgh

[57] ABSTRACT

An attachable beverage coaster for use particularly in a moving vehicle or the like for stably supporting a beverage container of the type having a recessed bottom surface and an annular bottom support surface circumscribing the recessed bottom surface on a flat base surface such as a table top, comprising: resilient, slip-resistant, relatively flat container support disk having a top surface and a bottom surface for abuttingly engaging the annular bottom support surface of the beverage container at the top surface thereof and for abuttingly engaging the base surface at the bottom surface thereof for supporting the container on the base surface in substantially nonslipping, nontouching relationship with the base surface; suction cup fixedly attached to a central portion of the contained support disk and extending upwardly from the top surface of the disk for selectively holdingly engaging the recessed bottom surface of the container; an attachment device for fixedly attaching the suction cup to the container support disk.

13 Claims, 2 Drawing Sheets

ATTACHABLE BEVERAGE COASTER

BACKGROUND OF THE INVENTION

The present invention relates generally to coasters for beverage containers and, more specifically, to an attachable beverage coaster which is adapted to be removably attached to the bottom surface of a beverage container such as a conventional aluminum soft drink can having a recessed bottom surface surrounded by an annular bottom support surface. The attachable beverage coaster is particularly adapted for providing a stable support surface for beverages consumed in a moving vehicle such as, for example, a boat, or RV/motor home, or in a similar motion environment in which the beverage container and the support base upon which it rests are subject to shocks and inertial forces which tend to overturn the beverage container or tend to cause the beverage container to slide across the surface of an associated support base.

In certain vehicles such as boats, RV motor homes, airplanes and the like, table-type support surfaces are provided for supporting food and beverages. Persistent problems in such vehicles are the overturning and sliding of beverage containers on the support surfaces when the vehicle accelerates or changes direction. As a result, various attempts have been made to provide a more stable support configuration for beverage containers. Beverage containers have, for example, been provided with bottom coatings to create a surface which is less resistant to slipping than the aluminum or glass from which beverage containers are ordinarily constructed. A problem with coating the bottom of containers is that it significantly increases the cost of manufacturing the containers. Another problem with bottom-coated containers is that such containers remain prone to overturning. In fact, because such containers, when subject to inertial force, are less likely to slide across an associated support surface, the tendency of the container to overturn is increased. Another device which has been used in association with beverage containers and which, in some cases, provides an increase in stability to an associated container is the insulating beverage holder. Such devices are generally constructed from polystyrene or other types of plastic foam. The surface of the plastic foam is generally more skid-resistant than the ordinary bottom surface of a container, and the broadened base provided by the bottom of the insulating holder provides a somewhat more stable base surface than the container bottom itself. However, such insulating holders, which by the very nature of the insulating function must be substantially as tall as an associated beverage container and somewhat larger in diameter than the beverage container, are quite bulky and relatively expensive to produce. Also, because of the fact that the base of an insulating holder is generally relatively thick, e.g. ½ inch, the center of gravity of an associated beverage container is raised thereby, thus tending to reduce the stability of the container and cancelling the desirable stabilizing effect provided by a broadened container base. Further, the foam material from which the more inexpensive of such insulating holders are constructed is generally not a durable material, and thus the insulating holders are subject to damage and must generally be replaced quite often.

A relatively inexpensive and easily stored device which is sometimes employed to stabilize a beverage container as well as to prevent moisture condensation is a conventional coaster constructed from a slip-resistant material such as, for example, paper board. Although conventional coasters are relatively easily stored and tend to prevent beverage containers from sliding, they do nothing to prevent a beverage container from tipping. Ordinary coasters also have the drawback of requiring a user to pick up the coaster and move it with him whenever he moves to a new location.

It would be generally desirable to provide a beverage container stabilizing device for use in a motion environment which overcomes the above-described problems associated with prior art devices. It would also be desirable to provide such a device which may be used without modification on various types of recessed-bottom cans, the type of beverage container which is most often used in boating and other recreational settings.

OBJECTS OF THE INVENTION

It is an object of the present invention to provide an attachable beverage coaster which is selectively attachable to the recessed bottom surface of a beverage container.

It is another object of the present invention to provide an attachable beverage coaster for use particularly in boating, RV camping and the like for stably supporting a beverage container on a support surface.

It is another object of the present invention to provide an attachable beverage coaster which is also detachable and reusable.

It is another object of the present invention to provide an attachable beverage coaster which is relatively compact and easily storable.

It is another object of the present invention to provide an attachable beverage coaster which is extremely durable.

It is another object of the present invention to provide an attachable beverage coaster which is relatively inexpensive to produce.

SUMMARY OF THE INVENTION

The present invention, in one embodiment, comprises an attachable beverage coaster for use, particularly in a moving vehicle or the like, for stably supporting a beverage container of the type having a recessed bottom surface and an annular bottom support surface circumscribing said recessed bottom surface, on a flat base surface such as a table top, comprising: (a) resilient, slip-resistant, relatively flat container support means having a top surface and a bottom surface for abuttingly engaging said annular bottom support surface of said beverage container at said top surface thereof and for abuttingly engaging said base surface at said bottom surface thereof for supporting said container on said base surface in substantially nonslipping, nontouching relationship with said base surface; (b) releasable holding means fixedly attached to a central portion of said container support means and extending upwardly from said top surface of said container support means for selectively holdingly engaging said recessed bottom surface of said container for attaching said beverage coaster to said beverage container, said releasable holding means being selectively removable from holding engagement with said recessed bottom surface; (c) attachment means for fixedly attaching said releasable holding means to said container support means; (d) whereby said beverage coaster is continuously attachable in covering relationship with the bottom of a beverage container for providing an isolating slip-resistant, lower covering for the container while a beverage is being consumed and whereby said beverage coaster is removable from said beverage container after the beverage is consumed therefrom and is thereafter reusably attachable to another beverage container.

The present invention, in another embodiment, comprises a method for relatively stably supporting a beverage container, such as a soft drink can, having a recessed bottom surface and an annular bottom support surface, on a base surface in a moving vehicle wherein the base surface and said beverage container when positioned thereon are subject to shocks and inertial forces associated with movement of the vehicle which tend to cause the beverage container to overturn or slide across the base surface, comprising the steps of: (a) providing a flat, resilient, slip-resistant member having a diameter larger than the diameter of the beverage container; (b) providing a suction cup assembly having a height less than the recess depth of the beverage container; (c) fixedly attaching the suction cup assembly to a central portion of the flat member; (d) releasably attaching a suction cup portion of the suction cup assembly to a central portion of the container recessed bottom surface; (e) positioning the beverage container on the base surface with the slip-resistant member positioned between the base surface and the container.

BRIEF DESCRIPTION OF THE DRAWING

An illustrative and presently preferred embodiment of the invention is shown in the accompanying drawing in which.

DETAILED DESCRIPTION OF THE INVENTION

Figure 5:
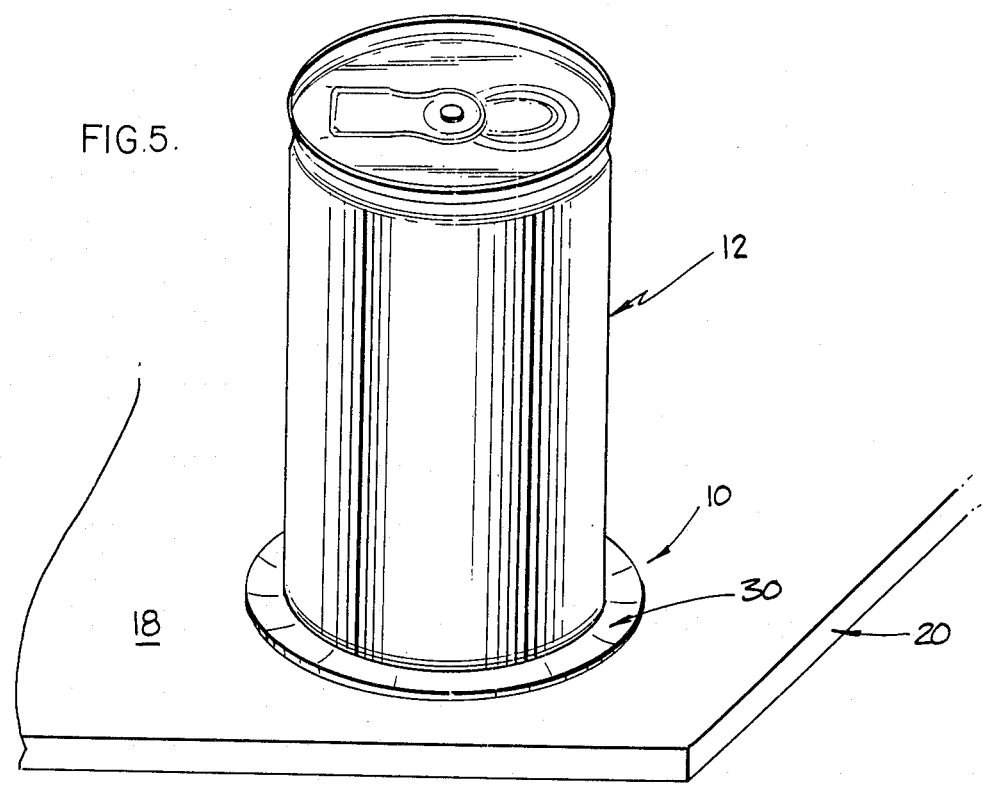
FIG. 5 is a perspective view of a beverage coaster attached to a beverage container and supported on a base surface.
Figure 6:
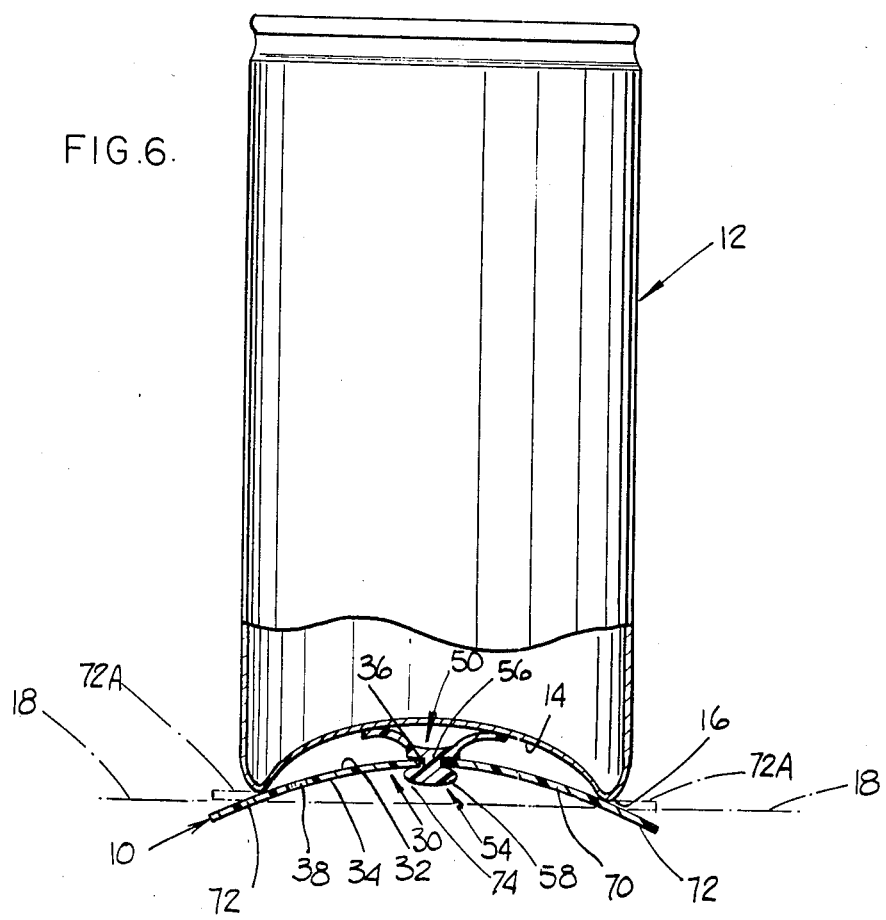
FIG. 6 is a partially cross sectional elevation view of a beverage container having a beverage coaster attached thereto showing the configuration of the attachable beverage coaster in non-engaged relationship with a base support surface in solid lines and showing the configuration of the beverage coaster in engaged relationship with a base support surface in phantom lines.

As best illustrated in FIGS. 5 and 6, the beverage coaster 10 of the present invention is adapted to be used in association with a beverage container 12, such as a can of the type having domed or other recessed bottom surface 14, which is typically 0.4 inches deep, and an annular bottom support surface 16, which is typically 2—2 ¼ inches in diameter at the outer diameter thereof. The attachable beverage coaster 10 is adapted to be attached to the bottom of the beverage container 12 and is also adapted to stably support the beverage container 12 on a flat base surface 18 such as provided by a table 20.

Figure 1:
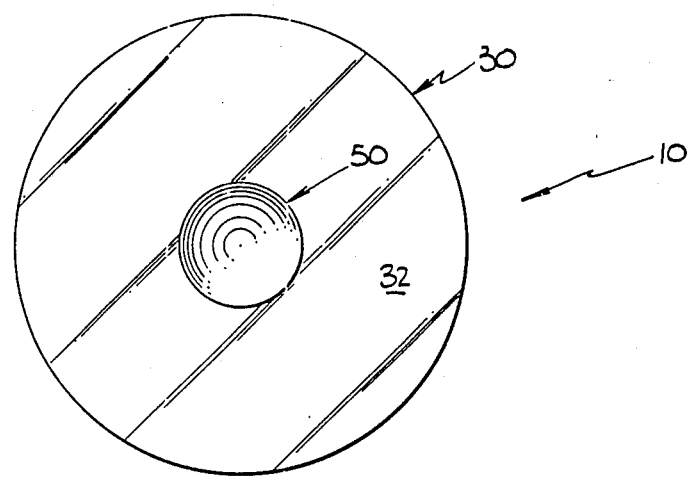
FIG. 1 is a top plan view of a beverage coaster.
Figure 2:
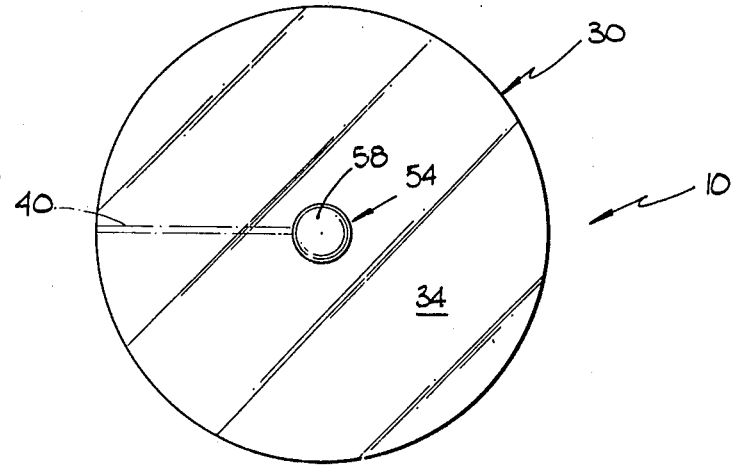
FIG. 2 is a bottom plan view of a beverage coaster.
Figure 4:
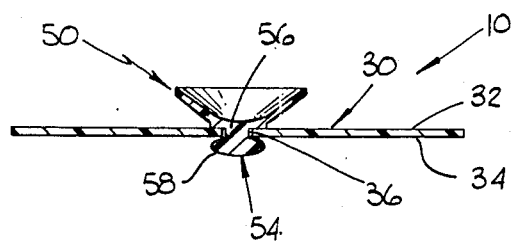
FIG. 4 is a cross sectional elevation view of a beverage coaster.

The beverage coaster 10 may comprise a resilient, slip-resistant, relatively flat container support means 30 such as a disk of flexible plastic having a diameter at least as large as the outer diameter of the annular bottom support surface 16 of an associated container, and preferably less than twice the diameter thereof, and most preferably having a diameter 10% to 50% greater than the diameter of the associated support container. For example, the support means may comprise a 0.1 inch thick, 3 inch in diameter, PVC plastic disk having a durometer of approximately 70A–75A. The support means 30 comprises a top surface 32 adapted to engage the annular bottom support surface 16 of the beverage container, and a bottom surface 34 adapted to engage flat base surface 18. A hole 36 which may have a diameter of, e.g., 0.15 inches may be provided at the center of the support means 30, as best shown in FIGS. 4 and 6. A vent hole 38 which may have a diameter of, e.g., 0.10 inches may be provided at a position which is adapted to be located inwardly of the annular bottom support surface 16 of an associated can when the beverage coaster is attached thereto. An embodiment of the device showing such a vent hole 38 is illustrated in FIG. 6. A radial vent passageway 40 in bottom surface 34 which may be, e.g., 0.1 inches wide may be provided as illustrated in phantom in FIG. 2.

The attachable beverage coaster 10 also comprises a releasable holding means for selectively attaching the coaster to or detaching the coaster from the recessed bottom surface 14 of the can. In one preferred embodiment of the invention, the releasable holding means comprises a suction cup 50 which may be constructed from PVC plastic having a durometer of approximately 70A–75A and which may have a maximum diameter of, e.g., 0.75 inches at the upper edge thereof and which may extend, e.g., 0.25 inches above support means 30 and which may have a cup depth of, e.g., 0.1 inches. The releasable holding means in another embodiment may comprise a relatively flat, resilient surface such as a central portion of support means 30 upper surface 34 having a relatively weak adhesive material applied to an upper portion thereof for holdingly engaging the recessed bottom surface 14 of a beverage container.

An attachment means 54 is provided for attaching the releasable holding means 50 to the support means 30. In one embodiment, the attachment means comprises a rivet assembly which is integrally formed with suction cup 50. The rivet assembly 54 comprises a shank portion 56 which may have a diameter of, e.g., 0.14 inches and an axial length slightly longer, e.g. 10% longer, than the thickness of container support means 30. The shank portion 56 is adapted to be received through hole 36 in support means 30. The rivet assembly also comprises an integrally formed head portion 58 adapted to be positioned opposite support means bottom surface 34. Head portion 58 may comprise a diameter of, e.g. 0.3 inches and an axial dimension of, e.g., 0.1 inches. The rivet assembly may also comprise a durometer of 70A–75A. The resilience of the support means 30 enables the rivet assembly to be pressed through the hole 36 to provide a relatively fixed attachment of the suction cup 50 to the support means 30.

Figure 3:
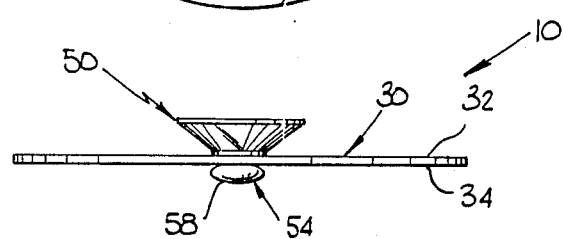
FIG. 3 is an elevation view of a beverage coaster.

The overall height of the suction cup 50 and integrally formed attachment means 54, when the suction cup is pressed into engagement with the recessed bottom surface 14 of a container, is less than the recess depth of the beverage container bottom, as illustrated in FIG. 6. This relationship between the height of the suction cup and attachment assembly and the recess depth ensures that the central portion of the beverage coaster 10 will be somewhat raised with respect to a flat support base surface 18 upon which the beverage container 12 and attachable coaster 10 are positioned. It will thus be seen that the coaster flexible support means 30 comprises a first state in unattached relationship with the container recessed bottom surface 14 wherein the flexible support means has a relatively flat shape, as best illustrated in FIGS. 3 and 4; a second state in attached relationship with the container recessed bottom surface 14 but in nontouching relationship with a base support surface 18 wherein the flexible support means 30 including an annular peripheral portion 72 thereof has a continuous, uniform, generally concave shape, as best illustrated by the solid lines in FIG. 6; and a third state in attached relationship with a container recessed bottom surface 14 and in contacting relationship with the base support surface 18 wherein the support means 30 has a generally concave shape at a central portion 70 thereof which is positioned inwardly of the annular bottom support surface 16 of the associated beverage container and further has a generally flat shape at an annular peripheral ring portion 72A thereof positioned immediately outwardly of the central portion 70, as best illustrated in FIG. 6 in phantom lines.

In operation, when a person desires to use the beverage coaster, he simply attaches suction cup 50 to the recessed bottom surface 14 of a beverage container. The support means 30 has sufficient elastic memory so as to assume the concave shape illustrated in FIG. 6 in solid lines prior to being placed on a support base and is also sufficiently flexible to assume the configuration shown in phantom lines in FIG. 6, after the beverage container is placed on a base surface 18. The lower surface portion of outer annular portion 72A provides a relatively high coefficient of friction between it and surface 18 which tends to prevent beverage container 12 from sliding on surface 18. The durometer of the material from which the support means 30 is constructed is sufficiently high so as to provide sufficient resistant to bending so as to substantially reduce the tendency of the container 12 to overturn when it is exposed to inertial forces such as caused by turning or acceleration of an associated vehicle. The support base 30 also provides a relatively larger mass about the bottom periphery of the container which further tends to reduce the tendency of the container to overturn when it is exposed to inertial forces, especially when the container is relatively empty.

It may be seen from FIG. 6 that a vacuum chamber 74 is formed in the area between the central portion 70 of the support member 30 and the base surface 18 when the container 12 is at rest on a support base surface 18 with a peripheral seal being provided by annular portion 72A. Such a vacuum chamber may be desirable in some circumstances to provide further holding force to prevent the container 12 from overturning. In such a situation, the vacuum may be broken by the user's lifting of an outer edge of annular portion 72A whenever he wishes to raise the container 12 from the table surface 18. In other circumstances, such a substantial vacuum may be undesirable, in which case the container support means 30 may be provided with a vent hole 38 therein, which at least partially releases the vacuum formed in chamber 74 (through venting into the area between the support means 30 and container bottom) sufficiently to allow the container and attached coaster 10 to be lifted from base surface 18 without manipulation of the coaster. Preferably, the suction associated with chamber 74 is less than the suction provided between suction cup 50 and the container bottom so that support means 30 releases from surface 18 with less force than that required to pull the beverage container 12 off suction cup 50. It will also be understood that the relative amount of suction provided between support means 30 and surface 18 may be controlled by varying the radial dimension of annular ring portion 72/72A of member 30 (by varying the diameter of support means 30 or by varying the diameter of an associated container annular bottom surface 16). The larger portion 72/72A becomes, the greater the associated suction force becomes. It will also be understood that the provision of a bottom radially extending vent passage such as 40 in bottom surface 34 of container support means 30 will substantially eliminate vacuum formation in chamber 74. Thus, it may be seen that, in one embodiment of the invention, container support means 30 provides a suction means for holding the coaster 10 and attached container 12 in stable relationship on base surface 18.

It will, of course, also be understood that the coaster 10, in addition to the above-described functions, also performs the function of isolating an attached beverage container 10 from support surface 18 to prevent marring of surface 18 by abrasive contact with a hard container surface or by moisture condensation.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An attachable beverage coaster for use, particularly in a moving vehicle or the like, for stably supporting a beverage container of the type having a recessed bottom surface and an annular bottom support surface circumscribing said recessed bottom surface, on a flat base surface such as a table top, comprising:
   (a) resilient, slip-resistant, relatively thin, flat container support means having a top surface and a bottom surface for abuttingly engaging said annular bottom support surface of said beverage container at said top surface thereof and for abuttingly engaging said base surface at said bottom surface thereof for supporting said container on said base surface in substantially nonslipping, nontouching relationship with said base surface, wherein said container support means comprises a periphery defining an area larger than the area of said recessed container bottom; said resilient support means comprising:
   (i) a first, undeformed state in unattached relationship with said container recessed bottom surface wherein said flexible support means has a relatively flat shape;
   (ii) a second, deformed state in attached relationship with said container recessed bottom surface and in nontouching relationship with a base surface wherein said flexible support means has a continuous, generally concave shape;
   (iii) a third, deformed state in attached relationship with said container recessed bottom surface and in contracting relationship with said base surface wherein said support means has a generally concave shape at a central portion thereof positioned inwardly of said annular bottom support surface of said container and has a generally flat shape at an annular ring portion thereof positioned immediately outwardly of said central portion;

(iv) whereby said coaster is adapted to be mounted on containers having a plurality of different bottom recess depths and diameters for providing stable nonslipping contact with a base surface;

(b) releasable holding means fixedly attached to a central portion of said container support means and positioned entirely above said top surface of said container support means for selectively holdingly engaging said recessed bottom surface of said container for attaching said beverage coaster to said beverage container independently of the engagement of said container support means with said annular bottom support surface, said releasable holding means being selectively removeable from holding engagement with said recessed bottom surface, wherein said releasable holding means comprises a suction cup means for selectively engaging said recessed bottom surface of said container;

(c) attachment means for fixedly attaching said releasable holding means to said container support means;

(d) whereby said beverage coaster is attachable in continuously attached covering relationship with the bottom of a beverage container for providing an isolating slip-resistant, lower covering for the container which remains attached to the container while the container is being removed from and returned to the base surface as a beverage is being consumed from the container and whereby said beverage coaster is removeable from said beverage container after the beverage is consumed therfrom and is thereafter reusably attachable to another beverage container.

2. The invention of claim 1 wherein said container support means comprises a disc having a diameter less than twice the diameter of said beverage container.

3. The invention of claim 2 wherein said container support means comprises a disc having a diameter 10% to 50% larger than the diameter of said beverage container.

4. The invention of claim 1 further comprising vent hole means extending between said top and bottom surfaces of said support means for venting air from between said bottom surface of said support means and said base surface to reduce vacuum formation therebetween.

5. The invention of claim 4 said vent hole means being positioned outwardly from the center of said support means a distance less than the radius of said beverage container.

6. The invention of claim 1 further comprising radially extending vent means associated with the bottom surface of said support means for venting air from between said bottom surface and said base surface to eliminate vacuum formation therebetween.

7. The invention of claim 1 wherein said resilient support means comprises a disk constructed from flexible PVC plastic.

8. The invention of claim 7 wherein said disk is approximately 0.1 inches thick.

9. The invention of claim 8 wherein said suction cup means is constructed from flexible PVC plastic.

10. The invention of claim 9 wherein said suction cup means comprises a diameter at an uppermost edge thereof of approximately 0.75 inches.

11. The invention of claim 1 wherein said resilient support means comprises base suction means for suctionally holding said coaster means in relatively fixed relationship with an associated base surface during said third state of said support means.

12. The invention of claim 11 wherein said suction cup means during engaged relationship with said container recessed bottom surface provides a suction associated with a first force value required for removing said suction cup from said recessed bottom surface and wherein said base suction means during said third state of said resilient support means provides a suction associated with a second force value required for removing said resilient support means from said base surface and wherein said first force value is greater than said second force value.

13. The invention of claim 1 wherein said resilient support means comprises:

(a) frictional slide resisting means for providing a greater sliding friction between said support means lower surface and said flat base surface than is provided between said container annular bottom support surface and said flat base surface whereby the tendency of a container to slide across said flat base surface is reduced when it is attached to said coaster;

(b) bottom broadening means for providing a broader bottom surface in engagement with said flat support base surface than is provided by said container annular bottom support surface whereby the tendency of a container to overturn is reduced when it is attached to said coaster;

(c) bottom weighting means for providing a relatively larger mass to the bottom of an associated container than is provided at other portions of the container when said container is attached to said coaster whereby the center of gravity of said container and attached coaster is relatively lower than the center of gravity with no coaster attached, especially when said container contains a reduced amount of beverage therein whereby the tendency of a container to overturn, especially when the associated beverage is partially consumed, is reduced when said container is attached to said coaster;

(d) suction means for providing a partial vacuum between said bottom surface of said flexible support means and said flat base surface for reducing the tendency of an attached beverage container to slide across said base surface or to overturn; and (e) whereby said beverage container is rendered substantially more stable on said flat base surface through attachment to said coaster.

* * * * *